(12) United States Patent
Mendoza et al.

(10) Patent No.: US 6,986,361 B2
(45) Date of Patent: Jan. 17, 2006

(54) COMPRESSED AIR FLOW CONTROLLER

(76) Inventors: Michael J. Mendoza, Air Perfection, Inc. 241 A W. A St., Dixon, CA (US) 95620; Jason T. Koch, Air Perfection, Inc., 241 A W. A St., Dixon, CA (US) 95620

( * ) Notice: Subject to any disclaimer, the term of this patent is extended or adjusted under 35 U.S.C. 154(b) by 99 days.

(21) Appl. No.: 10/346,332

(22) Filed: Jan. 17, 2003

(65) Prior Publication Data

US 2003/0196709 A1    Oct. 23, 2003

Related U.S. Application Data

(63) Continuation-in-part of application No. 10/127,977, filed on Apr. 23, 2002, now abandoned.

(51) Int. Cl.
*G05D 16/20*    (2006.01)

(52) U.S. Cl. .............................. 137/487.5; 137/599.11; 251/209

(58) Field of Classification Search ............. 137/487.5, 137/599.11; 251/315.16, 209
See application file for complete search history.

(56) References Cited

U.S. PATENT DOCUMENTS

| | | | |
|---|---|---|---|
| 1,822,668 A | | 9/1931 | Protzeller |
| 1,958,644 A | * | 5/1934 | Smith ...................... 137/487.5 |
| 2,509,295 A | * | 5/1950 | Glass ........................ 318/609 |
| 2,857,127 A | | 10/1958 | Millerwise |
| 3,257,094 A | | 6/1966 | Vischer |
| 3,355,145 A | | 11/1967 | de Castelet |
| 3,402,972 A | * | 9/1968 | Cooper et al. ................ 303/20 |
| 3,438,397 A | * | 4/1969 | Gilpin .................... 137/599.09 |
| 3,464,668 A | | 9/1969 | Jacob |
| 3,628,767 A | | 12/1971 | Lombard |
| 3,776,249 A | | 12/1973 | Wailes et al. |
| 4,972,872 A | | 11/1990 | Hunt |
| 5,011,112 A | | 4/1991 | Glamm |
| 5,038,820 A | * | 8/1991 | Ames et al. ................ 137/486 |
| 5,067,687 A | | 11/1991 | Patel et al. |
| 5,069,420 A | | 12/1991 | Stobbs et al. |
| 5,282,490 A | | 2/1994 | Higgs |
| 5,325,884 A | | 7/1994 | Mirel et al. |
| 5,427,149 A | | 6/1995 | Higgs |
| 5,431,203 A | | 7/1995 | Schultz et al. |
| 5,524,863 A | * | 6/1996 | Davis ......................... 251/127 |
| 5,586,574 A | | 12/1996 | Smith |
| 5,632,146 A | | 5/1997 | Foss et al. |
| 5,669,419 A | | 9/1997 | Haas |
| 5,901,741 A | | 5/1999 | Mudd et al. |
| 6,056,008 A | * | 5/2000 | Adams et al. ............ 137/487.5 |
| 6,142,163 A | * | 11/2000 | McMillin et al. ......... 137/487.5 |
| 6,305,664 B1 | | 10/2001 | Holmes et al. |

OTHER PUBLICATIONS

Delta Control Products, "Electronic Ball Valve Technical Schematic," from internet site: www.deltacontrol/UK%20SITE/UKpage4.htm, accessed Feb. 20, 2002, publication place unknown.

* cited by examiner

*Primary Examiner*—Stephen M. Hepperle
(74) *Attorney, Agent, or Firm*—Daniel P. Maguire

(57) ABSTRACT

An electrically-actuated flow controller for compressed air systems is disclosed. The flow controller includes a control panel, a transducer for sampling downstream air pressure, an electrical actuator with an electric motor, and a valve driven by the motor. The flow controller also optionally includes a bypass assembly and battery backup system. The transducer measures downstream pressure, and an electrical actuator incrementally positions the valve to maintain set point pressure between the flow controller and the point of use. By using an electrical actuator rather than the traditional pneumatic actuator, the present invention avoids the contamination and response time problems that have plagued earlier flow controllers.

6 Claims, 4 Drawing Sheets

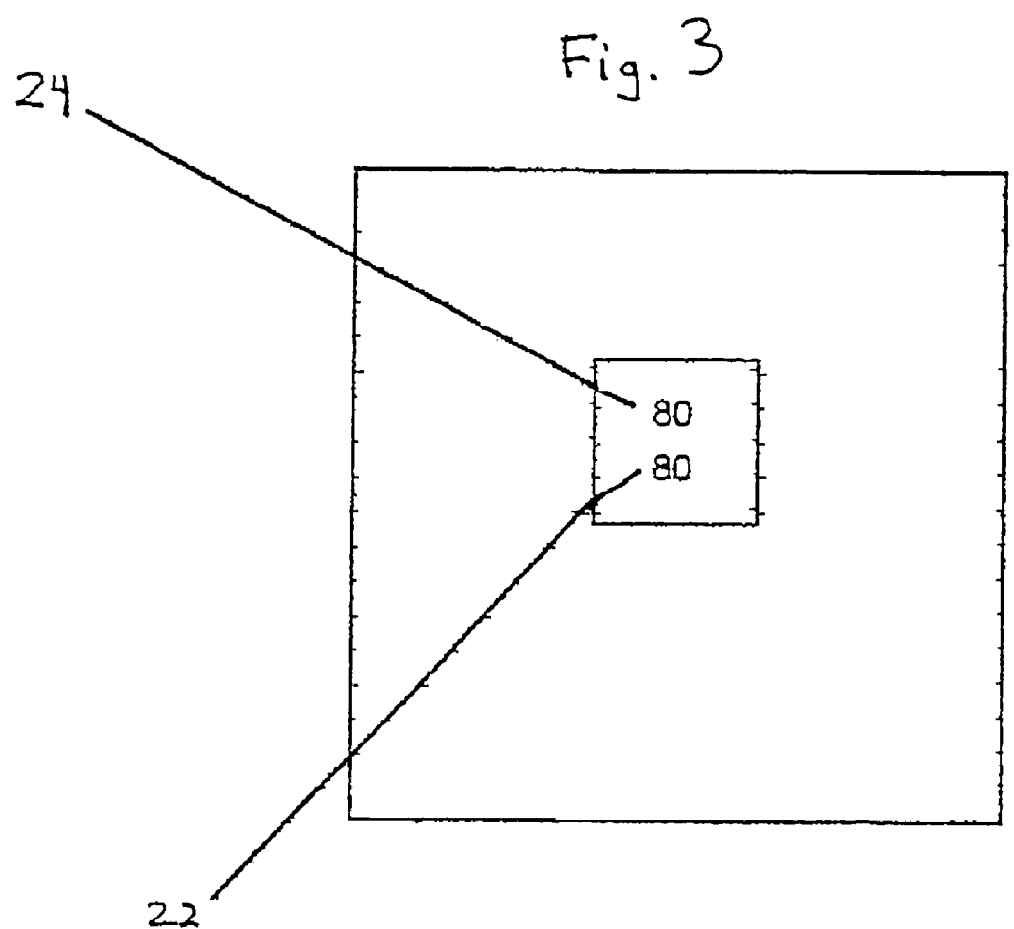

COMPRESSED AIR FLOW CONTROLLER

RELATED APPLICATIONS

This application is a continuation in part of the U.S. utility patent application with Ser. No. 10/127,977 filed Apr. 23, 2002, now abandoned.

BACKGROUND OF THE INVENTION

Compressed air systems require great amounts of energy, and to help reduce energy consumption, flow controllers have been developed. The typical flow controller is installed in the piping of a compressed air system between the compressors (which supply the pressurized air) and the point of use. The purpose of the flow controller is to maintain a desired or set point pressure downstream from the flow controller.

Without a flow controller, pressure in the piping varies with the loading and unloading of the compressor. Because of this variation, the compressor must work at higher levels in order to maintain minimum pressure levels throughout the system. With a flow controller, the downstream pressure is maintained at a constant level, thereby allowing the compressor to work less hard and consume less energy.

Flow controllers work by measuring downstream pressure using a transducer, and then adjusting the position of a valve to increase or decrease the pressure flow through the flow controller. In the past, flow controllers have used the air pressure in the system itself to actuate a positioner, which in turn drives the valve.

However, there are certain problems with such pneumatically actuated flow controllers. First, pneumatically-actuated positioners tend to fail because the pressurized air often carries with it moisture and contaminants, which interfere with the operation of the actuator. In certain cases, the moisture can even travel from the actuator through an electrical conduit down to the control panel, causing a short or other malfunction. Indeed, for compressed air systems that do not otherwise require a dryer, pneumatically-actuated positioners are unworkable, since the excess moisture will cause routine failure.

Second, these systems are prone to "hunting" or oscillation of the valve as its searches for the proper position to maintain set point pressure. "Hunting" results from a disparity between the relatively fast response time of the electronic means that are used to sample downstream pressure, and the relatively slow response time of the pneumatically-actuated positioner and valve.

Thus, there is a need for a flow controller that is not subject to failure resulting from contaminants in the pressurized air, and that is able to find and maintain the proper valve position without undue valve oscillation.

SUMMARY OF THE INVENTION

The present invention is an electrically-actuated flow controller, comprised of an electrical actuator, an optional bypass assembly, a valve, and an electronic control panel with sampling means. Because the actuator is electrically and not pneumatically actuated, it is not subject to failure due to air contaminants. Additionally, because the response time for the actuator is commensurate with the response time for the electronic control panel, unnecessary valve oscillation is greatly reduced. The present invention also may include a battery back-up, to allow continued operation of the flow controller in the event of a power interruption. If a battery back-up is not used, then an optional bypass assembly may be provided instead.

BRIEF DESCRIPTION OF THE DRAWINGS

FIG. 3 is a representation of a control panel according to the present invention.

DETAILED DESCRIPTION

The present invention is comprised of a control panel, a transducer, an electrical actuator, a control valve, and a battery back-up system. In an alternative embodiment, the battery back-up system is omitted, and a bypass assembly comprised of bypass piping, isolation valves, and a solenoid valve is provided instead.

Figure 1A:
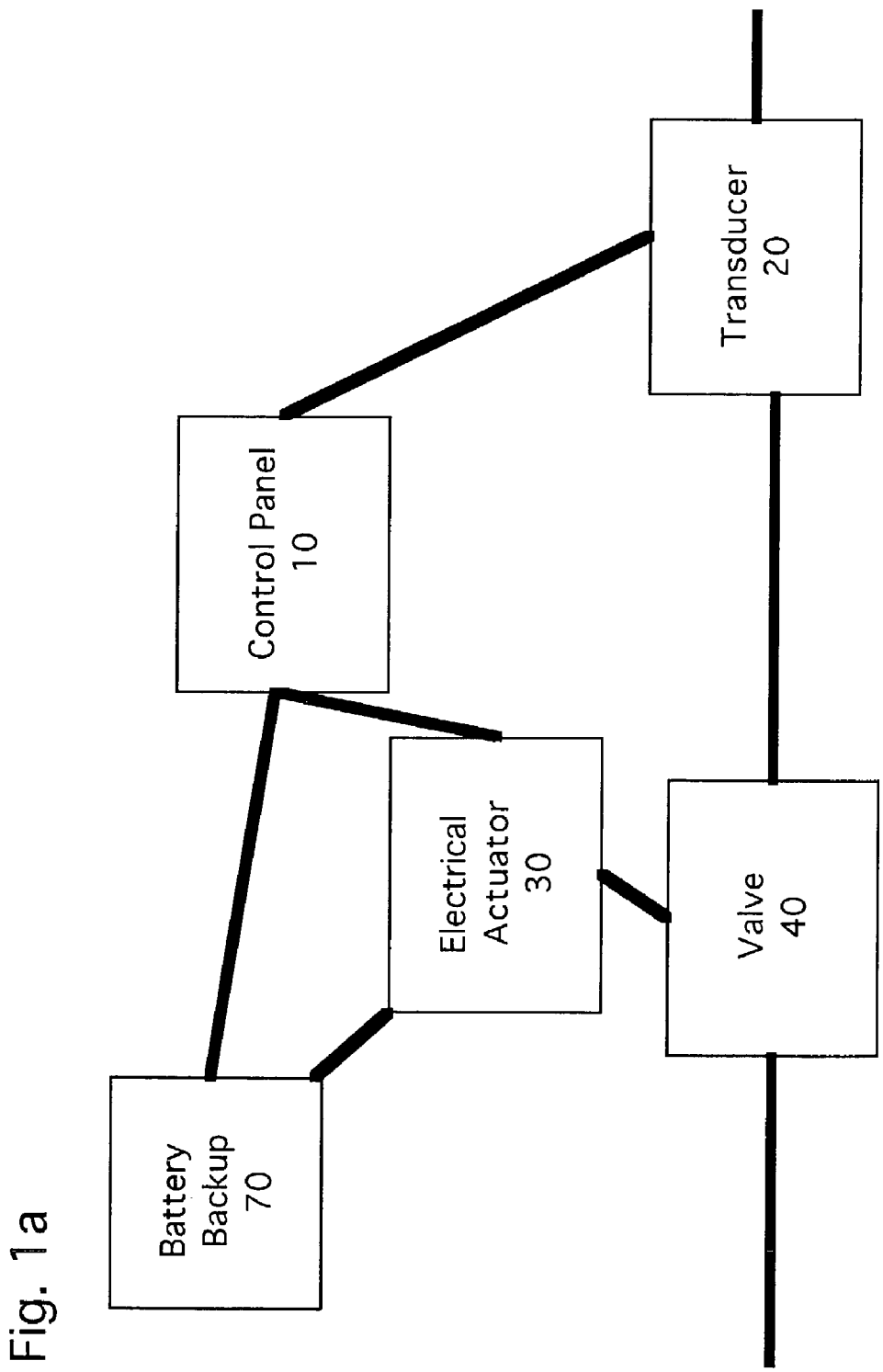
FIG. 1a is a block diagram of an electrically-actuated flow controller according to the present invention, with a battery back-up system.
Figure 1B:
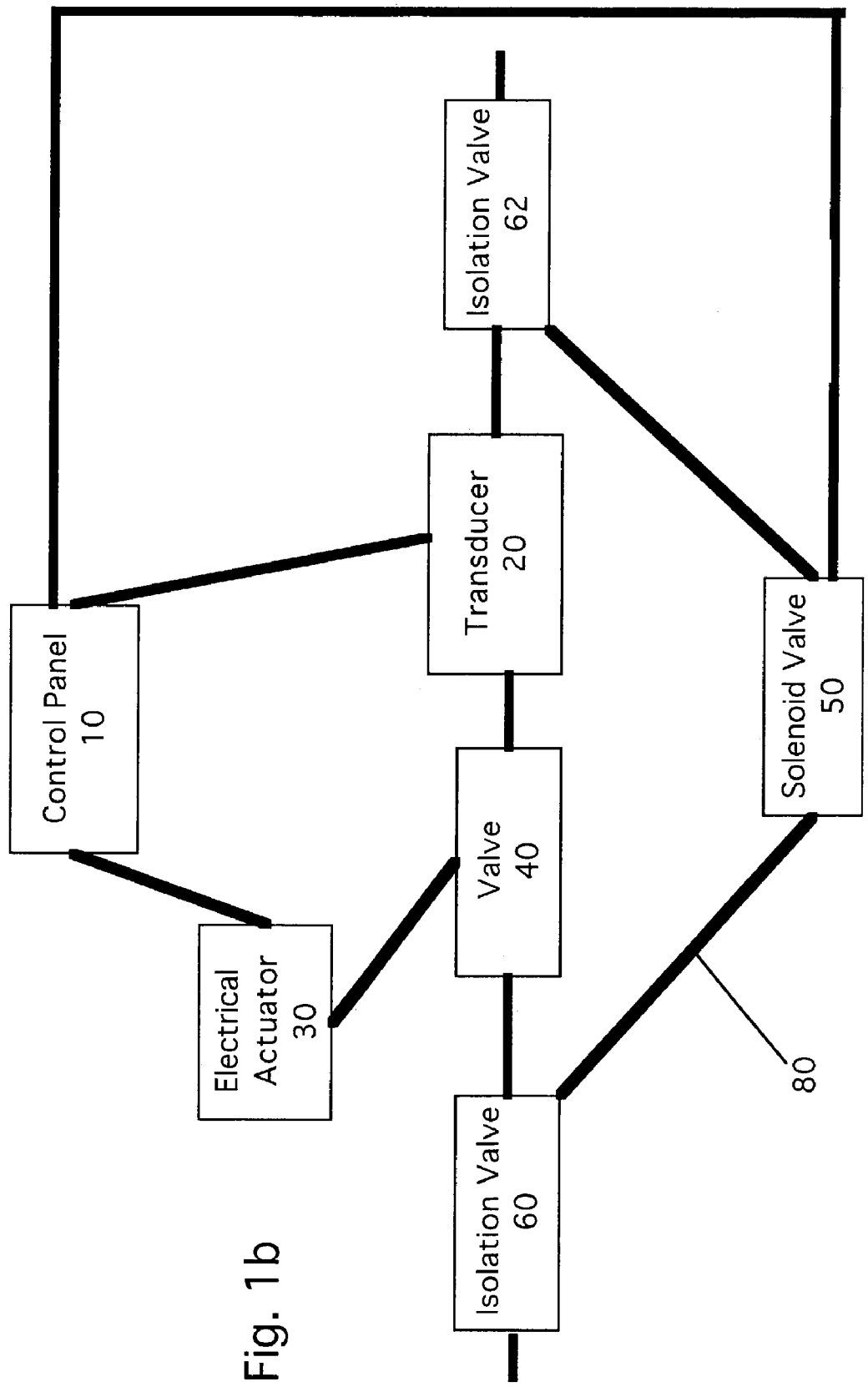
FIG. 1b is a block diagram of an alternative embodiment of an electrically-actuated flow controller according to the present invention, with a bypass assembly.

As represented in FIGS. 1 and 3, the control panel 10 receives an electronic signal from a transducer 20. The transducer 20 is placed in a portion of the piping downstream from the flow controller, and measures the air pressure at that point. The transducer can be placed either upstream or downstream from the downstream isolation valve 62. Acceptable transducers are available from Wika Instrument Corporation, 1000 Wiegand Blvd., Lawrenceville, Ga. Any transducer can be used so long as it is able to read air pressure up to 150 psi (700 psi for high pressure applications), and can translate that pressure to a 4–20 Ma signal. The transducer communicates with the control panel through a twisted pair of low voltage, low amperage wire.

In addition to the transducer 20, the control panel 10 has an enclosure, a power supply, and a proportional integrative derivative (PID). The PID receives and manipulates the electronic signal from the transducer, and then sends the modified signal to the actuator as a 4–20 Ma DC Voltage signal. More particularly, the signal from the transducer is compared to the set point pressure programmed in the PID. Based on this comparison, the PID creates and sends an appropriate signal to the actuator 30. Acceptable PIDs are available from Love Controls, 102 Highway 212, Michigan City, Ind.

The enclosure can be selected from any number of standard products, and must be large enough to enclose the power supply and the PID. It has been found that 10" by 12" by 6" panel provides a suitable enclosure. If the panel will be exposed to the weather, it must be rated NEMA 4. Acceptable enclosures are available from Rittal Corporation, 1 Rittal Place, Springfield, Ohio.

Similarly, the power supply for the control panel 10 can be selected from any number of conventional products, including products from Mamac Systems, 7400 Flying Cloud Dr., Minneapolis, Minn.

As represented in FIG. 3, the control panel 10 has a display for showing the current downstream pressure 22, and the current set point pressure, 24. The control panel also has a means within the PID for selecting a set point pressure, such as knobs, a dial, buttons, or a keypad. In one embodiment, buttons on the control panel allow the user to scroll through the set point pressure display until the desired pressure is reached.

A microprocessor within the PID compares the measured pressure with the set point pressure, and generates a 20 Ma DC signal based on this comparison. That signal is communicated to the actuator 30 by wire.

The actuator 30 has a body, electric motor, and gear unit. The actuator receives the 20 Ma DC signal from the control panel, and based upon that signal, its electric motor and gear unit properly and incrementally position the valve 40 so as to maintain set point pressure. When a battery back-up system is used, the actuator may have a 24 v DC power supply. When the bypass assembly is used, the actuator may have a 120 v AC power supply.

Acceptable actuators include but are not limited to the Nucom model 10NS from US Koei Technologies, Inc., 25506 Crenshaw Blvd., Torrance, Calif., and the EV1T1 model from Valvsys LLC, 421 Breaden Dr. Suite #15, Monroe, Ohio. The actuator from Koei is particularly appropriate for high pressure or high flow applications.

The actuator has means, such as a potentiometer, to determine stem position (shaft position). By comparing the stem position signal with the signal coming from the PID, the actuator determines how, if at all, the position of the valve should be adjusted to maintain set point pressure.

Figure 2:
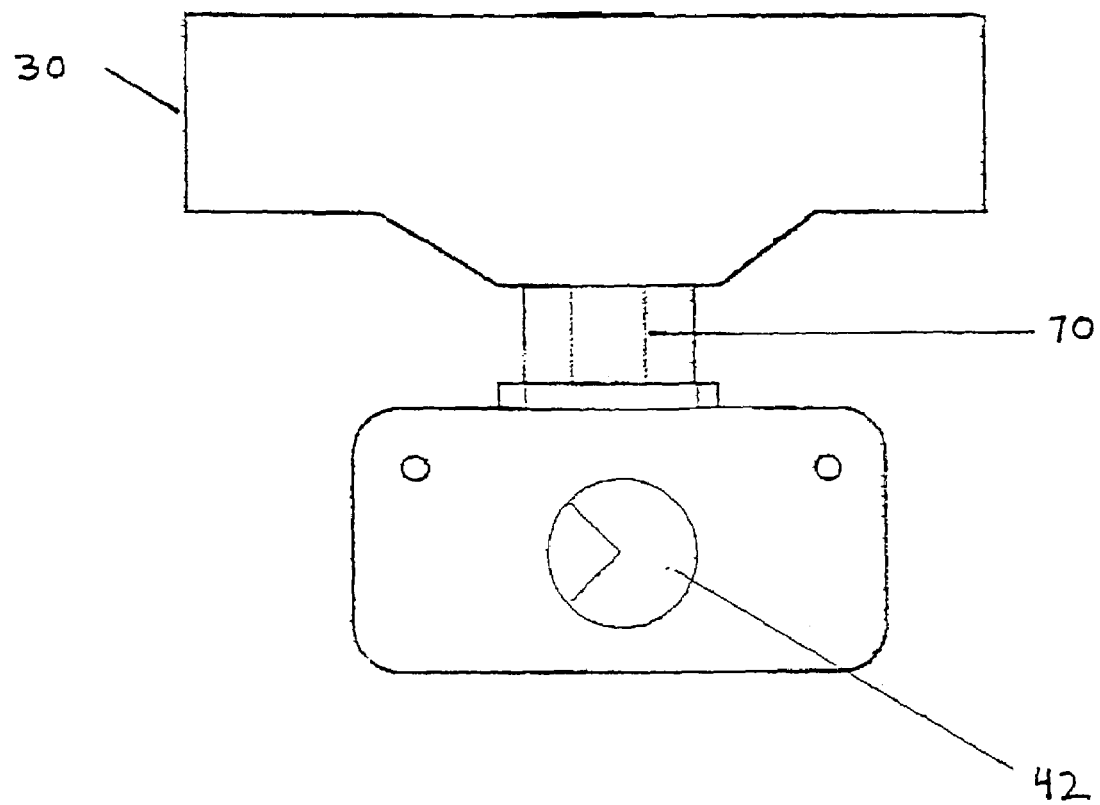
FIG. 2 is a representation of an actuator/valve assembly according to the present invention.

The actuator is connected to the valve through coupling 70, as shown in FIG. 2.

The valve 40 is placed within the piping of the pressurized air system, and controls the flow of pressurized air. For standard applications, a standard port ball valve within a stainless steel seat can be used. For high pressure or high flow applications, a ball valve with a V-port and stainless steel seat and body, such as the 300T316UVCM from KITZ Corporation of America, 10750 Corporate Drive, Stafford, Tex., can be used. Other acceptable valves include but not are limited to full port ball valves, butterfly valves, globe control valves, and v-port plug valves. A V-port ball valve 42 is shown in FIG. 2.

As depicted in FIG. 1a, the present invention also may include a battery backup system 70, to allow the flow controller to operate for a limited period of time in the event of a power outage. When such a system is used, the primary power supply to the control panel may be direct current, 24 Volts. A 24 Volt backup battery can then be added to the system in a normally closed relay. In the event of a power failure, the relay will open, and power can be drawn from the battery. A power failure light can be attached to the normally open side of the relay, thereby visually indicating power failure to the operator.

In one embodiment, the battery could be a 24 Volt device with a nominal capacity of 4.0 Ah. A suitable battery is Leoch Power model DJW 24-4.0 (24V 4.0 AH). With such a battery, the system could run for one to two hours after power failure.

In an alternative embodiment, the flow controller has a bypass assembly comprised of a solenoid valve 50, isolation valves 60, 62, and bypass piping 80 instead of a battery back-up system. The piping 80 connects the supply side of the flow controller to the demand side, and contains a solenoid valve 50. The solenoid valve 50 is wired in series with the power supply for the actuator, so that when the actuator loses power, the solenoid valve opens, allowing the pressurized air to bypass the flow controller. An acceptable solenoid valve is the 8210B57 from Asco General Controls, 50 Hanover Road, Florham Park, N.J. The bypass assembly also may include isolation valves 60, 62 which can be closed to allow for easy maintenance or repair of the flow controller.

One skilled in the art will appreciate that the present invention can be practiced by other than the described embodiments, which are presented for purposes of illustration and not limitation. Similarly, the particular component products described herein are presented for purposes of illustration, and other component products could be used without departing from the scope of the present invention.

We claim:

1. A flow controller for maintaining a desired set point pressure in a compressed air system, comprising:
    a transducer for sensing downstream pressure of compressed air in said system, and for generating an electronic signal based on said downstream pressure;
    a control panel configured to receive said electronic signal and to convert it to a second electronic signal, said second signal based on said first signal and on said desired set point pressure;
    an actuator, configured to receive said second signal;
    an electrical motor within said actuator;
    a valve, said valve incrementally driven by said electrical motor in response to said second signal;
    a bypass assembly comprising bypass piping and a solenoid valve.

2. The flow controller according to claim 1, wherein said control panel has means for displaying desired set point pressure.

3. The flow controller according to claim 1, additionally comprising a battery back-up system providing power to said control panel and said actuator in the event of a power failure.

4. The flow controller according to claim 1, wherein said control panel has a proportional integrative derivative.

5. An assembly for maintaining a desired set point pressure in a compressed air system, comprising:
    a transducer for sensing downstream pressure of compressed air in said system, and for generating an electronic signal based on said downstream pressure;
    a control panel containing a proportional integrative derivative configured to receive said electronic signal and to convert it to a second electronic signal, said second signal based on said first signal and on said desired set point pressure;
    an actuator, configured to receive said second signal;
    an electrical motor within said actuator;
    a valve, said valve incrementally driven by said electrical motor in response to said second signal,
    a bypass assembly comprising bypass piping and a solenoid valve.

6. The assembly according to claim 5, additionally comprising a battery back-up system providing power to said control panel and said actuator in the event of a power failure.

* * * * *